(12) United States Patent
Gregerson et al.

(10) Patent No.: US 10,981,099 B2
(45) Date of Patent: Apr. 20, 2021

(54) EXPANDABLE AIR FILTERS

(71) Applicant: 3M INNOVATIVE PROPERTIES COMPANY, St. Paul, MN (US)

(72) Inventors: Glen O. Gregerson, Hudson, WI (US); Laura C. Chesnut, Saint Paul, MN (US); Danielle M. Schreppel, Saint Paul, MN (US); Stephen M. Sanocki, Hudson, WI (US); Zhiqun Zhang, Roseville, MN (US); Craig D. Thompson, Inver Grove Heights, MN (US); David J. Prince, Saint Paul, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 274 days.

(21) Appl. No.: 15/762,713

(22) PCT Filed: Sep. 21, 2016

(86) PCT No.: PCT/US2016/052746
§ 371 (c)(1),
(2) Date: Mar. 23, 2018

(87) PCT Pub. No.: WO2017/053341
PCT Pub. Date: Mar. 30, 2017

(65) Prior Publication Data
US 2018/0272263 A1    Sep. 27, 2018

Related U.S. Application Data

(60) Provisional application No. 62/222,830, filed on Sep. 24, 2015.

(51) Int. Cl.
*B01D 46/00* (2006.01)
*B01D 46/52* (2006.01)
*B01D 46/10* (2006.01)

(52) U.S. Cl.
CPC ....... *B01D 46/521* (2013.01); *B01D 46/0002* (2013.01); *B01D 46/0005* (2013.01);
(Continued)

(58) Field of Classification Search
CPC .. B01D 46/00; B01D 46/521; B01D 46/0002; B01D 46/0005; B01D 46/0016; B01D 46/10; B01D 2265/06; B01D 2275/203
(Continued)

(56) References Cited

U.S. PATENT DOCUMENTS

| 2,639,004 A | 5/1953 | McIntyre |
| 4,135,900 A | 1/1979 | Westlin |

(Continued)

FOREIGN PATENT DOCUMENTS

| CN | 201133210 | 10/2008 |
| CN | 201526248 | 7/2010 |

(Continued)

OTHER PUBLICATIONS

International Search Report for PCT International Application No. PCT/US2016/52746, dated Jan. 26, 2017, 5 pages.

*Primary Examiner* — T. Bennett McKenzie
(74) *Attorney, Agent, or Firm* — Kevin Weber

(57) ABSTRACT

An expandable air filter. The air filter including a filter media assembly, an outer frame assembly, and at least one support member. The filter media assembly defines opposing, first and second major faces and a perimeter. The outer frame assembly is arranged about the perimeter. The support member is connected to the outer frame assembly and extends across the first major face. Further, the support member defines a line of separation at which the support member can be separated into first and second segment to permit expansion of the air filter. The filter media can form a plurality of pleats, with at least one pleat being free of (Continued)

bonding to the outer frame assembly. The unbonded pleat experiences expansion as the air filter transitions to an expanded state. The air filter can be configured for expansion in one or both of a length and width direction.

19 Claims, 8 Drawing Sheets

(52) U.S. Cl.
CPC ......... *B01D 46/0016* (2013.01); *B01D 46/10* (2013.01); *B01D 2265/06* (2013.01); *B01D 2275/203* (2013.01)

(58) Field of Classification Search
USPC .............................................. 55/496, DIG. 31
See application file for complete search history.

(56) References Cited

U.S. PATENT DOCUMENTS

| | | |
|---|---|---|
| 4,420,315 A | 12/1983 | Kershaw |
| 4,439,219 A | 3/1984 | Lambrecht |
| 5,252,111 A | 10/1993 | Spencer |
| 5,273,564 A | 12/1993 | Hill |
| 5,486,410 A | 1/1996 | Groeger |
| 5,492,551 A | 2/1996 | Wolfe |
| 5,597,645 A | 1/1997 | Pike |
| 5,662,728 A | 9/1997 | Groeger |
| 5,733,350 A | 3/1998 | Muller |
| 5,743,927 A | 4/1998 | Osendorf |
| 5,968,217 A | 10/1999 | Stein |
| 5,972,808 A | 10/1999 | Groeger |
| 6,033,454 A | 3/2000 | Hoeffken |
| 6,057,256 A | 5/2000 | Krueger |
| 6,152,980 A | 11/2000 | Culwell |
| 6,464,745 B2 | 10/2002 | Rivera |
| 6,485,538 B1 | 11/2002 | Toyoshima |
| 6,740,137 B2 | 5/2004 | Kubokawa |
| 6,858,297 B1 | 2/2005 | Shah |
| 6,916,352 B2 | 7/2005 | Sutton |
| 6,955,702 B2 | 10/2005 | Kubokawa |
| 7,037,354 B1 | 5/2006 | Dimicelli |
| 7,150,774 B2 | 12/2006 | Kubokawa |
| 7,169,202 B2 | 1/2007 | Kubokawa |
| 7,452,396 B2 | 11/2008 | Terlson |
| 7,622,063 B2 | 11/2009 | Sundet |
| 7,695,660 B2 | 4/2010 | Berrigan |
| 7,858,163 B2 | 12/2010 | Angadjivand |
| 7,947,142 B2 | 5/2011 | Fox |
| 7,959,699 B2 | 6/2011 | Privitt |
| 8,157,881 B1 | 4/2012 | Anoszko |
| 8,162,153 B2 | 4/2012 | Fox |
| 8,241,381 B2 | 8/2012 | Braunecker |
| 2004/0182055 A1 | 9/2004 | Wynn |
| 2008/0034718 A1* | 2/2008 | Schuld .................. B01D 46/521 55/495 |
| 2009/0077937 A1 | 3/2009 | Privitt |
| 2010/0101197 A1 | 4/2010 | Livingstone |

FOREIGN PATENT DOCUMENTS

| | | |
|---|---|---|
| DE | 19846652 | 3/2000 |
| JP | 09315142 | 12/1997 |
| JP | 2001311372 | 11/2001 |
| KR | 2007116296 | 12/2007 |
| WO | WO 1999-43413 | 9/1999 |

* cited by examiner

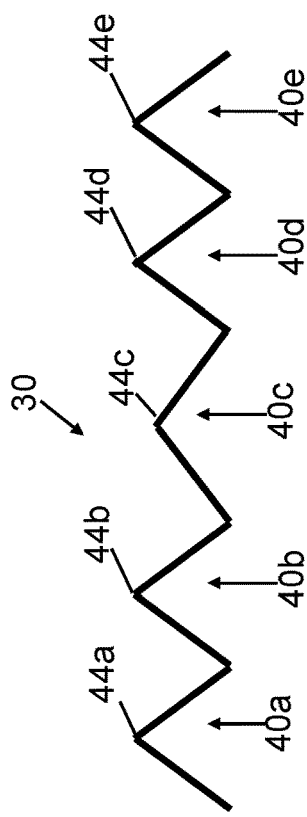
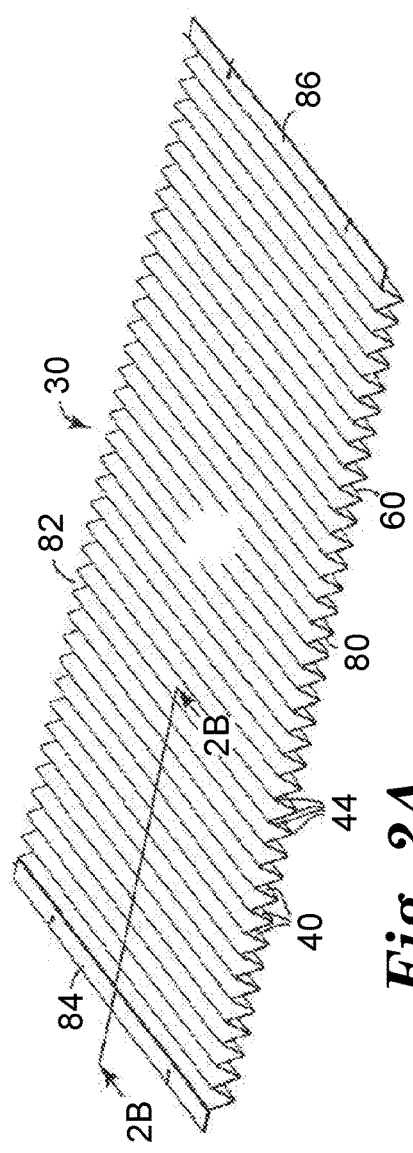
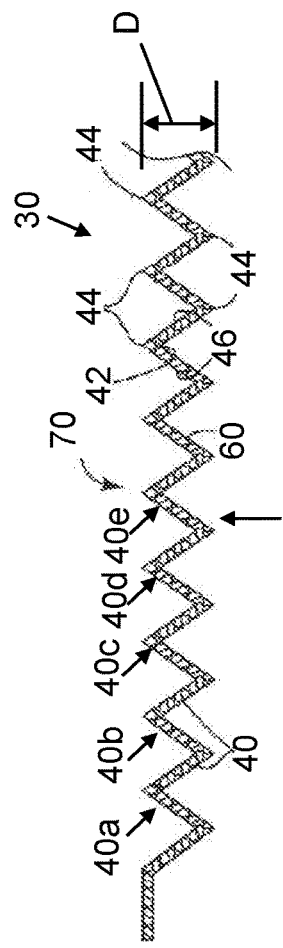
Fig. 2A
Fig. 2B
Fig. 2C

EXPANDABLE AIR FILTERS

CROSS REFERENCE TO RELATED APPLICATIONS

This application is a national stage filing under 35 U.S.C. 371 of PCT/US2016/52746, filed Sep. 21, 2016, which claims the benefit of provisional Application No. 62/222,830, filed Sep. 24, 2015, the disclosure of which is incorporated by reference in its/their entirety herein.

BACKGROUND

The present disclosure relates to air filters. More particularly, it relates to expandable air filters, such as expandable HVAC air filters, appropriate for use with multiple, differently sized air filter compartments.

Air filters are commonly used in forced air systems (e.g., residential heating, ventilation and air conditioning (HVAC) systems) in order to remove dust, dirt particles and the like. With many HVAC installations, a disposable air filter is conventionally employed. Such air filters typically include a filter media surrounded and supported by an outer frame. In addition to supporting the filter media, the outer frame rigidly defines a perimeter size and shape of the air filter. Other supporting and/or reinforcing components, such as mesh screens, adhesive beads, etc., may also be included. After a period of use, these filters become dirty or clogged and must be replaced.

To facilitate air filter replacement, HVAC systems conventionally house the air filter within a user-accessible compartment. The air filter is placed into and/or retrieved from the compartment via an access slot. In some instances, the air filter alone is inserted through the slot. In other instances, a separate cabinet is provided into which the air filter is placed, followed by insertion of the loaded cabinet through the slot. In all instances, upon final insertion of the air filter, a seal is desirably established between the outer frame of the air filter and framework of the compartment so as to prevent airflow around the air filter during use (and thus prevent un-filtered airflow from passing through the HVAC system). Preferred a replacement air filters have a size that corresponds with the expected size (in terms of height, width and depth) of the HVAC system's air filter compartment.

A number of "standard" HVAC air filter compartment sizes have gained industry acceptance over time and are widely employed. Replacement air filter manufacturers, in turn, attempt to make available for retail purchase air filters corresponding with these standard sizes, allowing a customer to select a particular air filter that should fit their HVAC system's compartment configuration. The rigid outer frame of conventional air filters dictates that the replacement air filter has the same size when shipped to a retailer, when presented to potential purchases, and when installation to the HVAC system is attempted. Because these typical HVAC air filters are thus rather bulky, they undesirably occupy a relatively large volume of space on transportation vehicles and retailer shelves. Further, where the retailer has limited available shelf space and/or desires to display for purchase a large number of differently-sized air filters, only a small number of larger-sized air filters (e.g., deep pleat air filters) can reasonably be presented on the retailer's shelving system. When the small number of a certain air filter size are subsequently removed from the shelf for purchase and the retailer does not consistently replenish the display shelf, it may undesirably appear to the next potential purchaser that the particular air filter size of interest is out of stock.

In addition, a potential customer may not immediately recall with confidence the correct air filter size for their HVAC system while at the retailer's place of business; this uncertainty can be exacerbated when a large number of different air filter sizes are displayed. Rather than purchase a potentially incorrectly-sized air filter, the consumer will instead decide to delay air filter replacement to a later date, potentially leading to inefficient operation of the HVAC system if a new air filter is not actually purchased for an extended period of time.

Moreover, the actual air filter compartment size associated with a particular HVAC system will oftentimes deviate from the designated "standard" or expected size. For example, the HVAC system manufacturer's specifications may identify an air filter size of 16"×20"×4", yet the actual air filter compartment is slightly smaller or slightly larger in one or more dimensions. Thus, a purchased 16"×20"×4" replacement air filter may not be an optimal fit the actual HVAC system compartment (e.g., the purchased air filter may be too large for straightforward insertion, or may be too small and lead to suboptimal HVAC system operation). These circumstances can be frustrating for the user, and can lead to even greater uncertainty when considering the next replacement air filter purchase.

The above-described concerns with conventional replacement HVAC air filters can also arise in other contexts. Many other types of air handling devices or systems (e.g., room air purifiers, window air filters, etc.) make use of a replaceable, rigid-frame air filter, and a plethora of differently-sized replacement air filters are presented for retail purchase. Once again, the relatively large number of differently-sized air filters that must be displayed occupies valuable retail shelf space, and a potential purchaser will oftentimes be unsure as to which size is a best "fit" at the time of purchase.

SUMMARY

The inventors of the present disclosure recognized that a need exists for an air filter that overcomes one or more of the above-mentioned problems.

Some aspects of the present disclosure relate to an air filter including a filter media assembly, an outer frame assembly, and at least one support member. The filter media assembly defines opposing, first and second major faces and a perimeter. The outer frame assembly is arranged about the perimeter. The support member is connected to the outer frame assembly and extends across the first major face. Further, the support member defines a line of separation at which the support member can be separated into first and second segment to permit expansion of the air filter in a first direction. In some embodiments, the filter media assembly is a pleated filter media assembly, forming a plurality of pleats. In related embodiments, at least one of the pleats is free of bonding to opposing side frame structures of the outer frame assembly, with the unbonded pleat experiencing expansion as the air filter transitions to an expanded state. In other embodiments, the air filter is configured for manual expansion from the initial state in one or both of a length direction and a width direction.

Other aspects of the present disclosure relate to a method of installing an air filter to an air handling device. The method includes receiving an air filter in an initial state. The air filter includes a filter media assembly, an outer frame assembly, and at least one support member. The outer frame assembly is arranged about a perimeter of the filter media assembly, and the support member extends across a major face of the filter media assembly. Further, the support member defines a line of separation. A size of an air filter compartment provided with the air handling device is evaluated. The support member is separated at the line of separation to create first and second segments. The air filter is expanded from the initial state to an expanded state corresponding with the evaluated size. In this regard, the step of expanding includes transitioning the first segment away from the second segment. The air filter is inserted into air filter compartment in the expanded state.

BRIEF DESCRIPTION OF THE DRAWINGS

FIG. 2A is a perspective view of a filter media assembly useful with the air filter of FIG. 1A and in an initial condition;
FIG. 2B is a side view of a portion of the filter media assembly of FIG. 2A;
FIG. 2C is a simplified side view of a portion of the filter media assembly of FIG. 2A in an expanded condition.

DETAILED DESCRIPTION

Figure 1A:
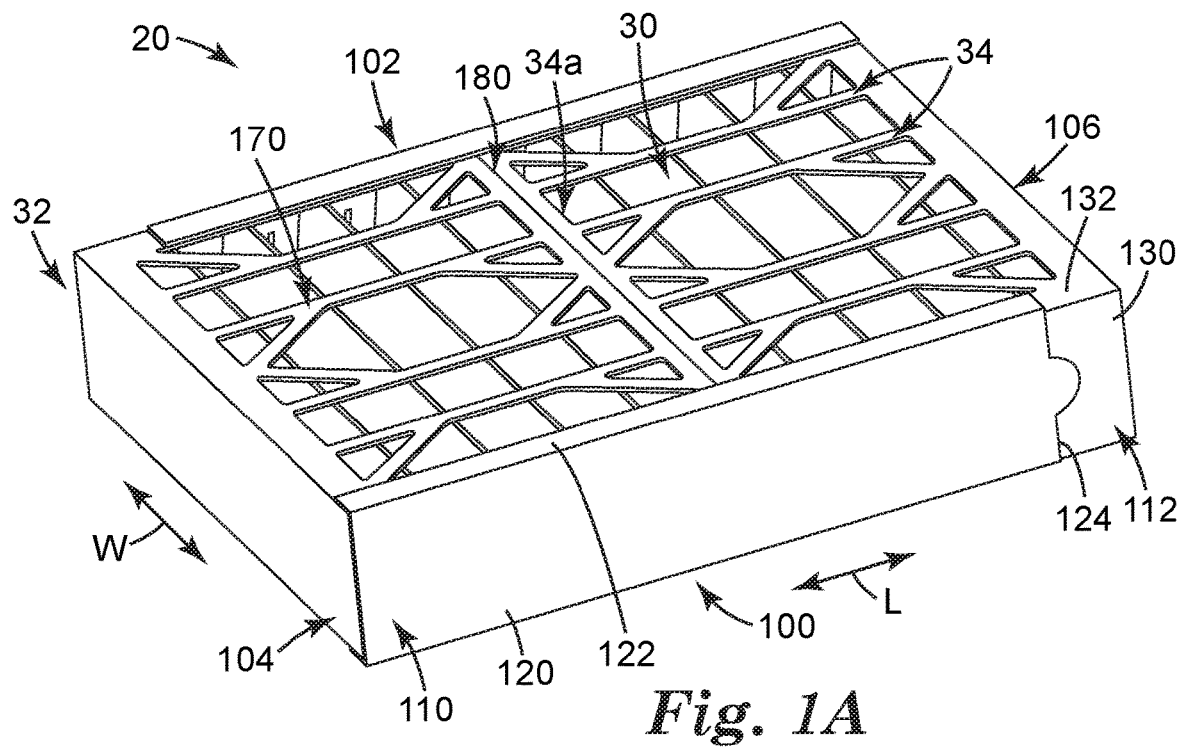
FIG. 1A is a perspective view of an air filter in accordance with principles of the present disclosure in an initial state.
Figure 1B:
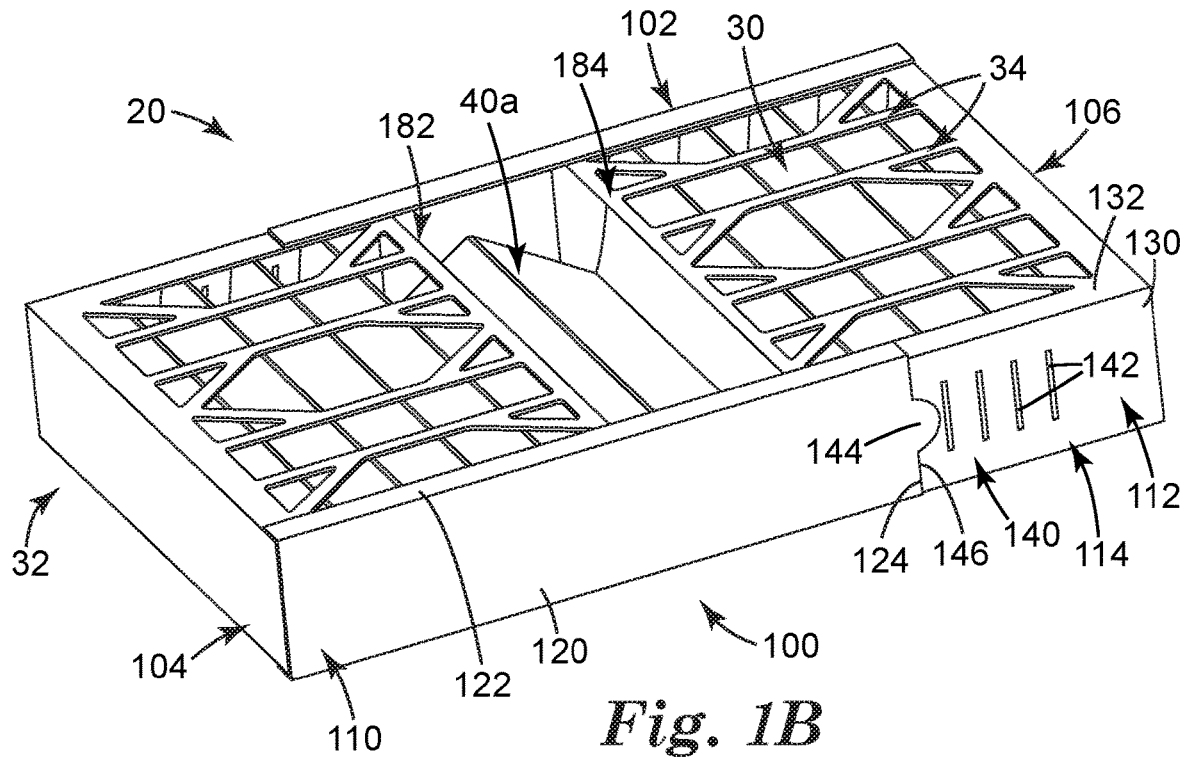
FIG. 1B is a perspective view of the air filter of FIG. 1A in an expanded state.

One embodiment of an air filter 20 in accordance with principles of the present disclosure is shown in FIGS. 1A and 1B. The air filter is generally configured to be manually expandable by a user from an initial state (FIG. 1A) in one or more directions to an expanded state, including expansion in a length direction L (i.e., the exemplary expanded state shown in FIG. 1B) and/or in a width direction W. The air filter 20 includes a filter media assembly 30, an outer frame assembly 32 and one or more support members 34. Details on the various components are provided below. In general terms, the filter media assembly 30 is retained within the outer frame assembly 32, with the one or more support members 34 supporting a major face of the filter media assembly 30. The air filter 20 is configured to be readily transitioned or expanded from the initial state to the expanded state(s) by first confirming separation of at least one of the support members 34 and then manipulating the outer frame assembly 32. In some embodiments, the filter media assembly 30 has a pleated construction, with one or more, but less than all, of the pleats experiencing expansion in transitioning of the air filter 20 from the initial state (FIG. 1A) to the length expanded state (FIG. 1B). In some embodiments, the filter media assembly 30 is secured by at least the outer frame assembly 32 in the initial state as well as the expanded state(s); the air filter 20 can thus be installed to, and used within, a corresponding air handling device (not shown) in the initial state as well as any expanded state. In some embodiments, the air filter 20 is sized for installation to a conventional HVAC system, with at least the outer frame assembly 32 supporting the filter media assembly 30 in the presence of HVAC system airflow. With these non-limiting constructions, depending upon a size of the air filter compartment provided with the HVAC system, a user can install the air filter 20 in the initial state, or can expand the air filter 20 in one or more directions to better match an actual size of the air filter compartment, better ensuring a desired seal is achieved between the air filter 20 and framework of the compartment.

The filter media assembly 30 can assume a wide variety of forms useful for air filtration, such as HVAC air filtration, presently known, or in the future developed. In some embodiments, the filter media assembly 30 is a pleated filter media assembly. By "pleated" is meant a web at least a portion of which has been folded to form a configuration comprising rows of generally parallel, oppositely oriented folds. For example, and as shown in FIGS. 2A and 2B, a pleated version of the filter media assembly 30 includes a plurality of pleats 40 each including a fold line 42 defining a pleat tip 44 and a pair of adjacent panels 46. Materials and construction of the pleated version of the filter media assembly 30 are such that the pleated filter media assembly 30 (or at least portions thereof) can be expanded from an initial condition as in FIG. 2B to an expanded condition as in FIG. 2C, with a spacing distance between at least some successive pleat tips 44 in the expanded condition being greater than that of the initial condition. For example, first-fifth pleats 40a-40e are identified in FIGS. 2B and 2C. In the initial condition, the first-fifth pleats 40a-40e have a substantially identical size, including a substantially identical spacing distance (e.g., within 10 percent of a truly identical spacing distance) between immediately adjacent pleat tips 44 (e.g., a spacing between the first and second pleat tips 44a-44b and a spacing between the fourth and fifth pleat tips 44d-44e is substantially identical). In the expanded condition of FIG. 2C, a size of the third pleat 40c has been increased, whereas the remaining pleats 40a, 40b, 40d, 40e are unchanged. Thus, in the expanded condition, a spacing distance between the third pleat tip 44c and the second pleat tip 44b, as well as between the third pleat tip 44c and the fourth pleat tip 44d has increased (as compared to the initial condition), whereas the spacing distance between the remaining pleat tips 44 is unchanged (i.e., the spacing between the first and second pleat tips 44a, 44b is substantially the same in both the initial and expanded conditions). As a point of reference, in this embodiment, the "expanded condition" of the pleated version of the filter media assembly 30 as an individual component generally corresponds with the "expanded state" of the air filter 20 (FIG. 1B) as a whole (and the "initial condition" of the pleated version of the filter media assembly 30 generally corresponds with the "initial state" of the air filter 20 (FIG. 1A)), except that the outer frame assembly 32 (FIG. 1A) includes additional components (described below) that retain the filter media assembly 30 in the particular size and shape of the various states. In other words, while the pleated version of the filter media assembly 30 can be transitioned (e.g., expanded) to any of a number of different "expanded conditions", the pleated version of the filter media assembly 30 cannot, in and of itself, self-retain the shape of any one particular condition. The air filter 20, however, as whole can self-retain the shape of the selected initial or expanded state as dictated by the outer frame assembly 32 as described below.

The pleated version of the filter media assembly 30 can consist of a pleated filter media or web 60 alone (as in the illustrated embodiment), or can include one or more additional components or structures mentioned below that are applied or assembled to a pleated filter media 60 so long as the resultant pleated filter media assembly 30 can at least be transitioned from the initial condition to the expanded condition without damaging the structural integrity of the pleated filter media assembly 30. The pleated filter media 60 of the assembly 30 can be self-supporting or non-self-supporting. As used herein, the term "self-supporting filter media or web" can describe at least one of the following conditions: (1) a filter media or web that is deformation resistant without requiring stiffening layers, adhesive or other reinforcement in the filter media web; or (2) the filter media generally maintains its shape when subjected to an airstream as described, for example, in U.S. Pat. No. 7,169,202 to Kubokawa, the entire teachings of which are incorporated herein by reference; or (3) a web or media having sufficient coherency and strength so as to be drapable and handleable without substantial tearing or rupture. As used herein, the term "non-self-supporting" can denote an air filter media that is not capable, in the absence of a support frame and/or a support grill, of withstanding the forces encountered due to typical air flow. For example, where the pleated version of the filter media assembly 30 consists of the pleated filter media 60 alone, the pleated filter media or web 60 can be self-supporting or non-self-supporting. Where the pleated version of the filter media assembly 30 consists of the pleated filter media or web 60 and a support structure, the pleated filter media 60 can be non-self-supporting with the additional supporting structure rendering the pleated filter media assembly 30, as a whole, to be self-supporting.

The particular filter media 60 selected for the pleated version of the filter media assembly 30 is not critical to the present disclosure so long as the resultant pleated filter media assembly 30 (whether consisting solely of the pleated filter media 60 alone or with additional structures applied thereto) has the desired characteristics described herein. The filter media 60 can be constructed, for example, from nonwoven fibrous media formed of thermoplastics or thermosetting materials such as polypropylene, linear polyethylene and polyvinyl chloride. Other suitable, non-limiting materials for the filter media include porous foams, nonwovens, papers, fiberglass, or the like. The filter media assembly 30 can optionally include a highly open wire mesh or screen, one or more adhesive strands, etc., that is bonded to the filter media 60 in order to enhance the pleatability thereof and that is pleated along with the filter media 60 itself. The wire mesh or screen (or other additional component) may impede re-collapsing of the pleated version of the filter media assembly 30 from the expanded condition. In other embodiments, the pleated version of the filter media assembly 30 can incorporate wire-supported pleats, self-supported mini-pleats, or other pleat constructions currently available or in the future developed.

In some embodiments, the filter media 60 comprises a nonwoven web that can have random fiber arrangement and generally isotropic in-plane physical properties (e.g., tensile strength), or if desired may have aligned fiber construction (e.g., one in which the fibers are aligned in the machine direction as described in U.S. Pat. No. 6,858,297 to Shah et al., the teachings of which are incorporated herein by reference) and anisotropic in-plane physical properties. Some or all of the fibers comprising the nonwoven webs useful with the filter media 60 can be multicomponent fibers having at least a first region and a second region, where the first region has a melting temperature lower than the second region. Some suitable multicomponent fibers are described, for example, in U.S. Pat. Nos. 7,695,660, 6,057,256, 5,597,645, 5,972,808, 5,662,728 and 5,486,410 the teachings of each of which are incorporated herein by reference in their entireties.

Other nonwoven webs useful with the filter media 60 can be a high loft spunbond web, such as described, for example, in U.S. Pat. No. 8,162,153 to Fox et al., the entire teachings of which are incorporated herein by reference. In other embodiments, the filter media 60 can be a low loft spunbond web, such as those described in U.S. Pat. No. 7,947,142 to Fox et al., the entire teachings of which are incorporated herein by reference. In yet other embodiments, nonwoven webs useful with the filter media 60 are generated by other techniques and/or have other characteristics, such as the meltblown nonwoven webs disclosed in U.S. Pat. No. 6,858,297 to Shah et al. (mentioned above). Other non-limiting example of useful nonwoven web formats include bi-modal fiber diameter meltblown media such as that described in U.S. Pat. No. 7,858,163, the entire teaching of which are incorporated herein by reference.

In some embodiments, an electrostatic charge is optionally imparted into or on to material(s) of the filter media 60. Thus, the filter media 60 can be an electret nonwoven web. Electric charge can be imparted to the filter media 60 in a variety of ways as is well known in the art, for example by hydrocharging, corona charging, etc. (e.g., as described in U.S. Pat. No. 7,947,142 (mentioned above)). In other embodiments, the filter media 60 is not electrostatically charged.

The optional pleats can be formed in the filter media 60 (or in the pleated filter media assembly 30) using various methods and components as are well known in the art, e.g., to form a pleated filter for use in applications such as air filtration, for example those described in U.S. Pat. No. 6,740,137 to Kubokawa et al. and U.S. Pat. No. 7,622,063 to Sundet et al., the entire teachings of both of which are incorporated herein by reference.

With pleated versions of the filter media assembly 30, a variety of pleat depths D can be incorporated. In some embodiments, the pleated filter media assembly 30 has a pleat depth D of at least about 4 inches, optionally not less than 4 inches (e.g., a "deep pleat" pleated filter media). Other depths, greater or smaller, are also acceptable.

In other embodiments of the present disclosure, portions or all of the filter media assembly 30 need not have a pleated construction. The filter media associated with these alternate configurations desirably exhibits a capability of being transitioned or expanded from the initial condition to the expanded condition without damaging a structural integrity of the filter media.

Regardless of an exact construction, the filter media assembly 30 defines opposing, first and second major faces 70, 72 (referenced generally in FIGS. 2A-2C). Further, a perimeter of the filter media assembly can be defined by opposing, first and second side edges 80, 82, and opposing, first and second end edges 84, 86. In some embodiments, the perimeter can have the rectangular shape (that is specifically inclusive of a square shape) shown.

Returning to FIGS. 1A and 1B, the outer frame assembly 32 can assume a variety of forms and is generally configured to surround the perimeter of the filter media assembly 30. Further, the outer frame assembly 32 is constructed to robustly support the filter media assembly 30 in the initial state as well as in any of the expanded states described below, including the outer frame assembly 32 rigidly maintaining a selected size and shape when subjected to expected forces of a designated end-use environment (e.g., the outer frame assembly 32 will maintain its structural integrity with installation to an HVAC system air filter compartment and subjecting the air filter 20 to normal HVAC system airflow). With this in mind, the outer frame assembly 32 includes or defines opposing, first and second side frame structures 100, 102 and opposing, first and second end frame structures 104, 106. The side frame structures 100, 102 are generally configured to cover a respective one of the first and second side edges 80, 82 (FIG. 2A) of the filter media assembly 30, whereas the end frame structures 104, 106 are generally configured to cover a respective one of the first and second end edges 84, 68 (FIG. 2A).

In some embodiments, the first and second side frame structures 100, 102 have an identical construction, and are configured to facilitate expansion and retention of the air filter 20 from the initial state to the expanded length state (FIG. 1B). For example, FIGS. 1A and 1B illustrate the first side frame structure 100 as including a first frame member 110, a second frame member 112, and a locking apparatus 114 (referenced generally in FIG. 1B). The first and second frame members 110, 112 can employ a complimentary construction that promotes sliding movement of the first frame member 110 relative to the second frame member 112 (and vice-versa). The locking apparatus 114 can be configured to impede collapsing of the first side frame structure 100, and thus collapsing of the air filter 20, from the expanded length state (FIG. 2B) as described below.

The first frame member 110 can be akin to a rail, and provides a panel 120 and opposing flanges 122 (one of which is visible in the views). The panel 120 can be sized and shaped to receive and support at least a portion of the filter media assembly first side edge 80 (FIG. 2A), and has a height corresponding with (e.g., slightly greater than) the depth D (FIG. 2B) of the filter media assembly 30. The panel 120 extends from (e.g., is connected to) the first end frame structure 104, and terminates at leading edge 124. The opposing flanges 122 project from opposite sides of the panel 120, and are generally configured to interface with a corresponding major face 70, 72 (FIG. 2B) of the filter media assembly 30.

The second side frame member 112 can have a similar construction, including a panel 130 and opposing flanges 132 (one of which is visible in the views). The panel 130 can be sized and shaped to receive and support (apart from the first side frame member panel 120) at least a portion of the filter media assembly first side edge 80 (FIG. 2A). The panel 130 extends from (e.g., is connected to) the second end frame structure 106, and terminates at a leading edge (hidden in the views). A height of the second side frame member panel 130 is again commensurate with the depth D (FIG. 2B) of the filter media assembly 30. In some embodiments, however, the second side frame member panel 130 is slightly smaller than the first side frame member panel 120 (at least in terms of height). With this construction, upon final assembly, each of the flanges 132 of the second side frame member 112 nest within a corresponding one of the flanges 122 of the first side frame member 110. Further, a length (i.e., distance of extension from the corresponding end frame structure 104, 106) of each of the panels 120, 130 is selected to ensure that the panels 120, 130 overlap one another in the initial state and in the expanded length state(s). As a point of reference, the outer frame assembly 30 establishes a footprint or exterior dimensions of the air filter 20, including a length dimension in the length direction L. The length dimension in the initial state is pre-determined in accordance with an expected end use application of the air filter 20 as described below. With this desired initial state length dimension in mind, the side frame members 110, 112 are then designed or dimensioned so as to ensure the desired initial state length dimension is provided, including an overlap of the panels 120, 130 (e.g., a combined length of the panels 120, 130 is greater than the desired length in the initial state). Regardless, the panel 130 of the second side frame member 112 is disposed against an interior of the panel 120 of the first side frame member 110. With this construction, the first side frame member 110 can slide relative to the second side frame member 112 (and/or vice-versa).

Selective expansion of the first side frame structure 100 can be provided with a number of other constructions that may or may not include the overlapping, sliding frame members 110, 112. For example, one or more additional frame members can be provided that interconnect the first and second frame members 110, 112 in a sliding fashion; with these configurations, the first and second frame members 110, 112 need not overlap one another, but can slide relative to the additional frame member(s) in effectuating an expansion in length of the air filter 20.

The locking apparatus 114 is best shown in FIG. 1B and can assume a variety of forms. Some embodiments include a locking tab 140 and one or more locking slots 142. The locking tab 140 is defined at the leading end 124 of the first side frame member 120 and generally includes a tab 144 projecting from a shoulder 146. The locking slot(s) 142 are sized to receive the tab 144 and can be formed in or through a thickness of the second side frame member 120. For example, the locking slot(s) 142 can be a slit, slot, perforations, etc. In some embodiments, a plurality of locking slots 142 are provided, with the locking slots 142 being spaced from one another along a length of the second side frame member 120. A location of each of the locking slots 142 can correspond with a particular length dimension of the air filter 20 in an expanded length state. With these and similar versions, indicia (not shown) can be displayed on the second side frame member 120 in close proximity to each locking slot 142, indicating to a user an approximate length dimension of the air filter 20 that would result from placement of the tab 144 in the corresponding locking slot 142.

During use, upon transitioning the air filter 20 to an expanded length state, the locking tab 140 can be inserted into a corresponding one of the locking slots 142. Once inserted, the shoulder 146 engages or bears against a surface of the panel 130 of the second side frame member 112. When the air filter 20 is subsequently subjected to a compression-type force in the length direction L, an interface between the shoulder 146 and the panel 130 prevents the side frame members 110, 112 from sliding relative to one another. Thus, when the locking apparatus 114 is engaged, the air filter 20 will not readily collapse in the length direction L.

The locking apparatus 114 can assume a wide variety of other formats that may or may not include the locking tab 140 and/or the locking slots 142. For example, the locking tab 140 can be selectively secured to the second side frame member 112 in other ways that do not necessarily entail or require the locking slots 142. Some examples include adhesive, mechanical fastener, complimentary hook-and-loop strips, stretch release adhesive strips (e.g., products available under the trade name COMMAND™ from 3M Company of St. Paul, Minn.), etc. In yet other embodiments, the locking apparatus 114 can include one or more components apart from (or not integrally formed or provided with) the side frame members 110, 112. For example, a double-sided adhesive strip or similar components. With these and other embodiments, the locking tab 140 and the locking slots 142 are optionally omitted.

As mentioned above, the second side frame structure 102 can have an identical construction as the first side frame structure 100. Alternatively, the first and second side frame structures 100, 102 can have differing configurations, each permitting selective expansion of the air filter 20 in the length direction L and resistance to collapsing forces (in the length direction L) when the air filter 20 is arranged in an expanded length state.

The first and second end frame structures 104, 106 can have an identical construction, and in some embodiments each consists of a single, continuous frame member as reflected by FIG. 1A. In these non-limiting embodiments, the air filter 20 may not be readily expandable in a width W direction. In other embodiments, the first and second end frame structures 104, 106 can be configured to facilitate expansion of the air filter 20 in the width direction W, for example by incorporating two (or more) slidably connected frame members as described above with respect to the first side frame structure 100. In some embodiments, then, the end frame structures 104, 106 are configured to promote selective, locked arrangement of the air filter 20 in an expanded width state.

The outer frame assembly 32 can be formed from a variety of materials capable of maintaining their structural integrity in the presence of expected forces. For example, the outer frame assembly 32 can be constructed of cardboard, paperboard, plastic, metal, etc. In some embodiments, the outer frame assembly 32 integrally forms the side and end frame structures 100-106. Thus, in some embodiments a major portion of the outer frame assembly 22 may be conveniently formed by the folding of a suitable precursor material (e.g., paperboard) along fold lines so as to provide the side and end frame structures 100-106. However, any suitable frame construction may be used; i.e. any major portion of the outer frame assembly 32 may be made of any suitable material (whether paperboard, plastic, etc.) and may be formed e.g. by folding of a single frame piece, by the assembling of multiple pieces to each other, and so on. In many embodiments, all four major frame structures 100-106 may each comprise upstream and downstream flanges and inner and outer sidewalls/panels and foldable connections there between.

The one or more support members 34 project from the outer frame assembly 32 and extend over the first major face 70 (best identified in FIG. 2B) of the filter media assembly 30. In some embodiments, the support member(s) 34 are provided as part of a grid or grill 170 conventionally included with HVAC air filters and other types of air filters. The support member(s) 34 can serve to reinforce the air filter 20 in one or both of the length and width directions L, W, and can extend between various ones of the frame structures 100-106 in various manners and directions. The pattern reflected by FIG. 1A is but one acceptable configuration. At least one of the support members 34, for example the first support member 34a identified in FIG. 1A, incorporates one or more features that facilitate expansion of the air filter 20 from the initial state to the expanded length state of FIG. 1B.

In some embodiments, in the initial state of the air filter 20, the first support member 34a includes or defines a line of separation 180 (referenced generally in FIG. 1A) at which the first support member 34a can be manually separated by a user into first and second segments 182, 184 (identified in FIG. 1B). The line of separation 180 can assume various forms, including perforations, partial cuts, full cuts, slits, slots, or other line of weakness imparted into, or through a thickness of, the first support member 34a. Where the line of separation 180 includes a plurality of spaced-apart cuts or perforations, the arrangement is selected such that a user can readily "complete" the spaced-apart cuts or perforations by hand using normal effort. In other embodiments, the first and second segments 182, 184 can be completely unattached along the line of separation 180 in the initial state (e.g., the first support member 34a need not necessarily be a complete, uninterrupted structure in some embodiments). With these and similar configurations, the first and second segments 182, 184 bear against each other in the initial state of the air filter 20, and are readily separated.

As evidenced by a comparison of FIGS. 1A and 1B, once the first and second segments 182, 184 are detached from one another at the line of separation 180 (e.g., by manually completing the line of separation 180), the first support member 34a permits transitioning of the air filter 20 from the initial state to the expanded length state. More particularly, the outer frame assembly 32 can be manipulated as described above, for example expanding the first and second side frame structures 100, 102, with the first and second segments 182, 184 being moved away from one another. In this regard, a location of the line of separation 180 (in the initial state) corresponds with other features associated with the air filter 20, and in particular locations at which the filter media assembly 30 is not directly fixed to the side frame structures 100, 102.

Figure 3A:
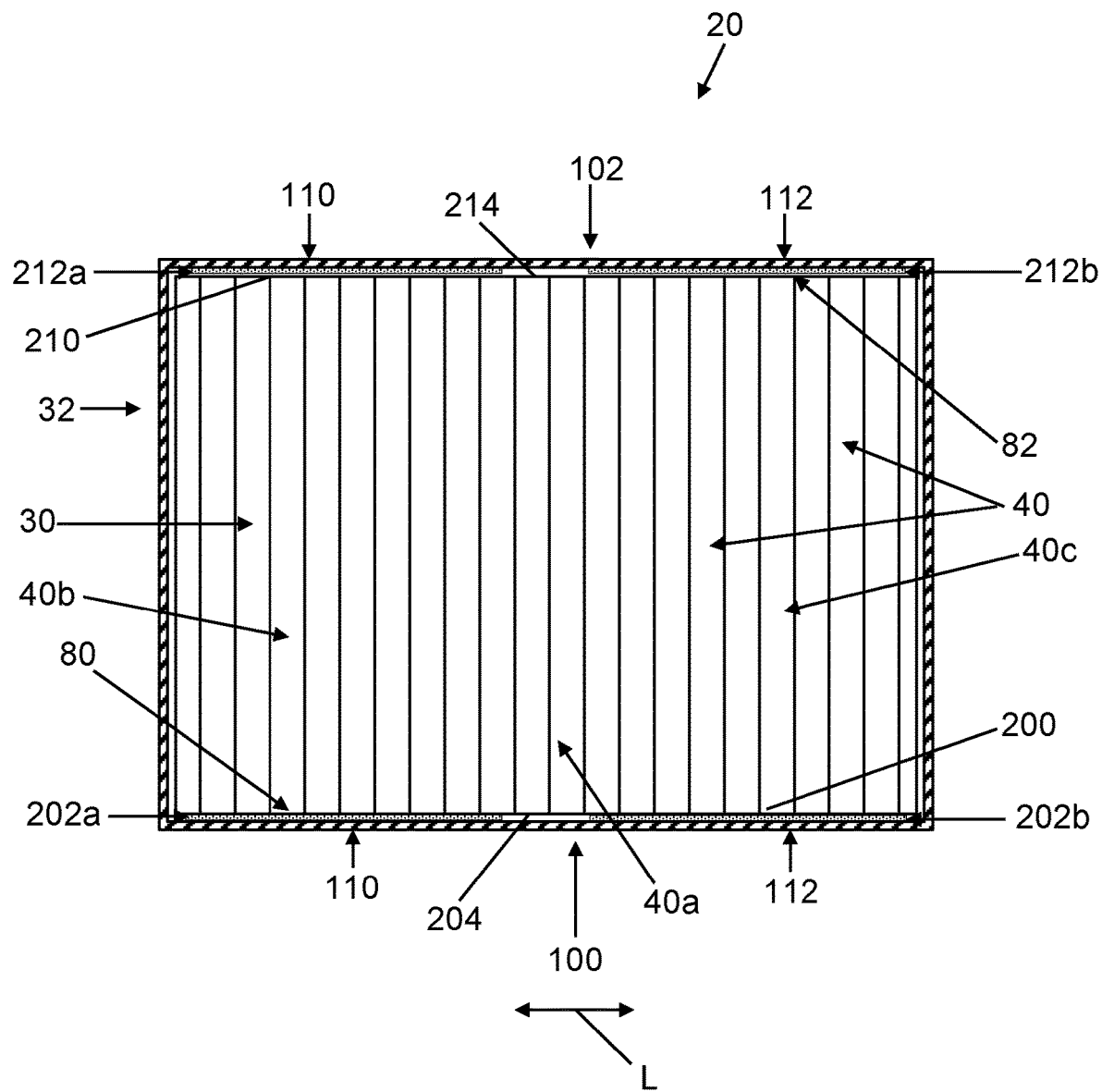
FIG. 3A is a simplified top view of the air filter of FIG. 1A with portions removed and illustrating bonding of the filter media assembly to an outer frame assembly.

For example, FIG. 3A is a simplified representation of attachment between the filter media assembly 30 and the outer frame assembly 32 in the initial state. For ease of illustration, the outer frame assembly 32 is shown as being a continuous structure, it being recalled that in some embodiments, the first and second side frame structures 100, 102 each include the first and second frame members 110, 112 (referenced generally in FIG. 3A for each of the side frame structures 100, 102) that are slidably connected to one another. One or more portions (identified at 200) of the first side edge 80 are secured or adhered to the first side frame structure 100 by adhesive 202a, 202b (e.g., one or more beads or strips of adhesive or glue). In some embodiments, the adhesives 202a, 202b collectively encompasses less than an entirety of the first side edge 80 such that a second, unbonded portion 204 of the first side edge 80 is free of adhesive and is not directly fixed, bonded or adhered to the first side frame structure 100. Similarly, one or more portions (identified at 210) of the second side edge 82 may be secured or adhered to the second side frame structure 102 by adhesive 212a, 212b (e.g., one or more beads or strips of adhesive or glue). In some embodiments, the adhesives 212a, 212b collectively encompasses less than an entirety of the second side edge 82 such that a second, unbonded portion 214 of the second side edge 82 is free of adhesive and is not directly fixed, bonded or adhered to the second side frame structure 102. In some embodiments, the unbonded portions 204, 214 are aligned with one another, and represent a location at which the filter media assembly 30 can freely expand with expansion of the outer frame assembly 32 in the length direction L, and in particular with expansion of the corresponding pair of frame members 110, 112 relative to one another.

The filter media assembly 30 shown in FIG. 3A includes a plurality of pleats 40; the unbonded portions 204, 214 correspond with one or more, but less than all, of the pleats

40. For example, first-third pleats 40*a*-40*c* are identified in FIG. 3A. The unbonded portions 204, 214 are defined for an entirety of the first pleat 40*a* (i.e., the first pleat 40*a* is free of adhesion to the first and second side frame structures 100, 102 at the corresponding first and second side edges 80, 82). Conversely, the second pleat 40*b* (as well as additional ones of the pleats 40) is directly bonded (along the side edges 80, 82) to the first frame member 110 of both of the first and second side frame structures 100, 102 by the corresponding adhesive strips 202*a*, 212*a*. The third pleat 40*c* (as well as additional ones of the pleats 40) is directly bonded (along the side edges 80, 82) to the second frame member 112 of both of the first and second side frame structures 100, 102 by the corresponding adhesive strips 202*b*, 212*b*. With this construction, and as reflected by FIG. 3B, with expansion of the outer frame assembly 30 to an expanded length state as described above (i.e., the first and second frame members 110, 112 of both of the side frame structures 100, 102 slide relative to each other), the second pleat 40*b* travels with the first side frame members 110 such that a width or tip-to-tip spacing of the second pleat 40*b* remains unchanged. The third pleat 40*c* similarly experiences no or minimal change in width or tip-to-tip spacing due to direct attachment to the second frame members 112. However, because the first pleat 40*a* is not directly adhered to the side frame support structures 100, 102, as the first and second frame members 110, 112 slide relative to the first pleat 40*a* in opposite directions, with the first pleat 40*a* experiences an increase or expansion in width or tip-to-tip spacing.

Figure 3B:
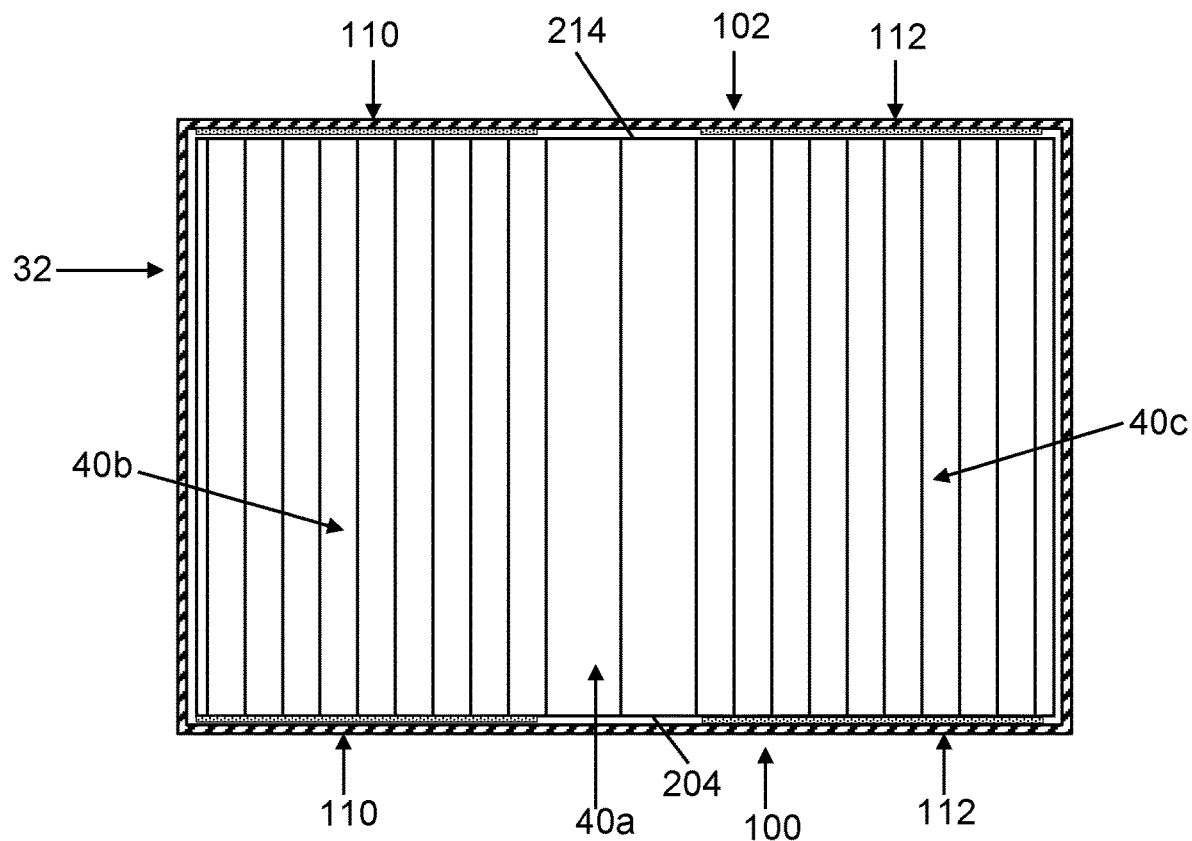
FIG. 3B is a simplified top view of the arrangement of FIG. 3B in an expanded state.

While FIGS. 3A and 3B illustrate a single one of the pleats 40 (i.e., the first pleat 40*a*) being free of direct adhesion to the side frame support structures 100, 102 and undergoing expansion with transition of the outer frame assembly 32 to an expanded length state, in other embodiments two or more of the pleats 40 can be free of direct bonding to the outer frame assembly 32. Further, two or more spaced apart unbonded portions 204, 214 can be provided (it being understood that each of the pleat(s) associated with an aligned pair of unbonded portions 204, 214 can experience an expansion in width with transition of the outer frame assembly 32 to an expanded length state).

With additional reference to FIGS. 1A and 1B, in this embodiment, the line of separation 180 is aligned with the unbonded portions 204, 214 and with the first pleat 40*a* that is otherwise able to freely expand with transition of the outer frame assembly 32 from the initial state to the expanded length state. FIG. 1B further reflects the increased width or tip-to-tip spacing of the first pleat 40*a* in the expanded length state. In embodiments in which the first support member 34*a* is provided as part of the grill or grid 170 that can optionally be glued to the pleats 40 along the first major face 70 (e.g., at the corresponding tips 44 (FIG. 2A)), the first support member 34*a* overlies the first pleat 40*a* but is free of bonding to the first pleat 40*a*. The air filter 20 is thus configured to be easily transitioned by a user from the initial state to an expanded length state of a desired dimension in the length direction L.

Figure 4A:
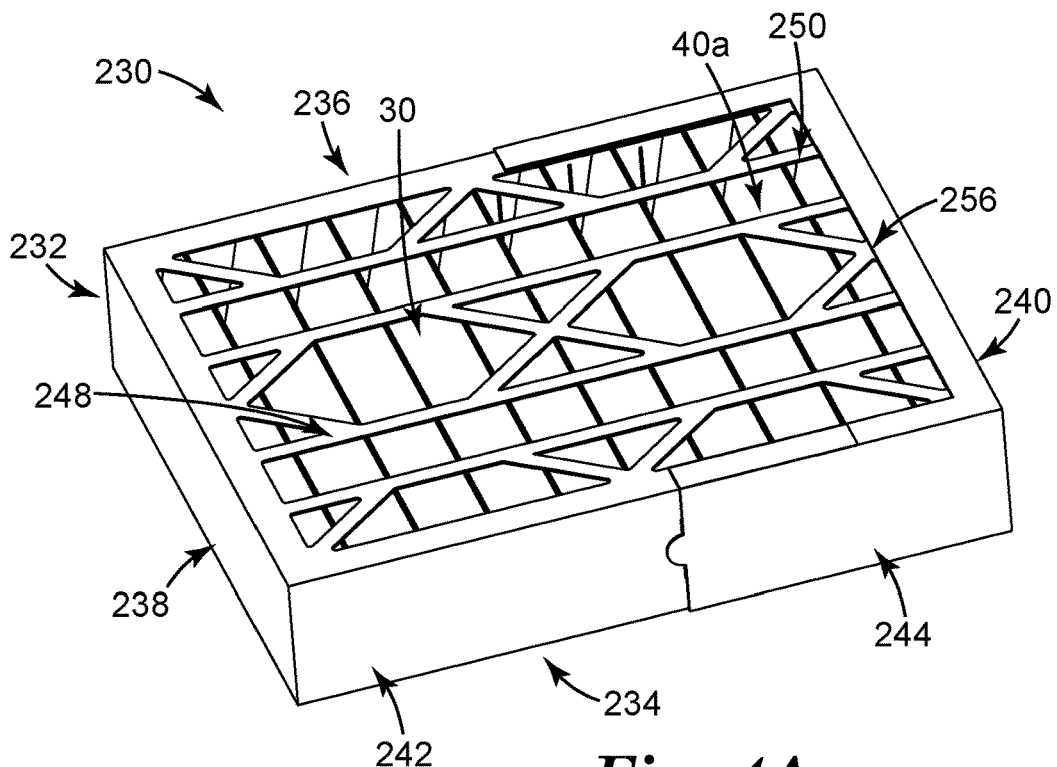
FIG. 4A is a perspective view of another air filter in accordance with principles of the present disclosure and in an initial state.
Figure 4B:
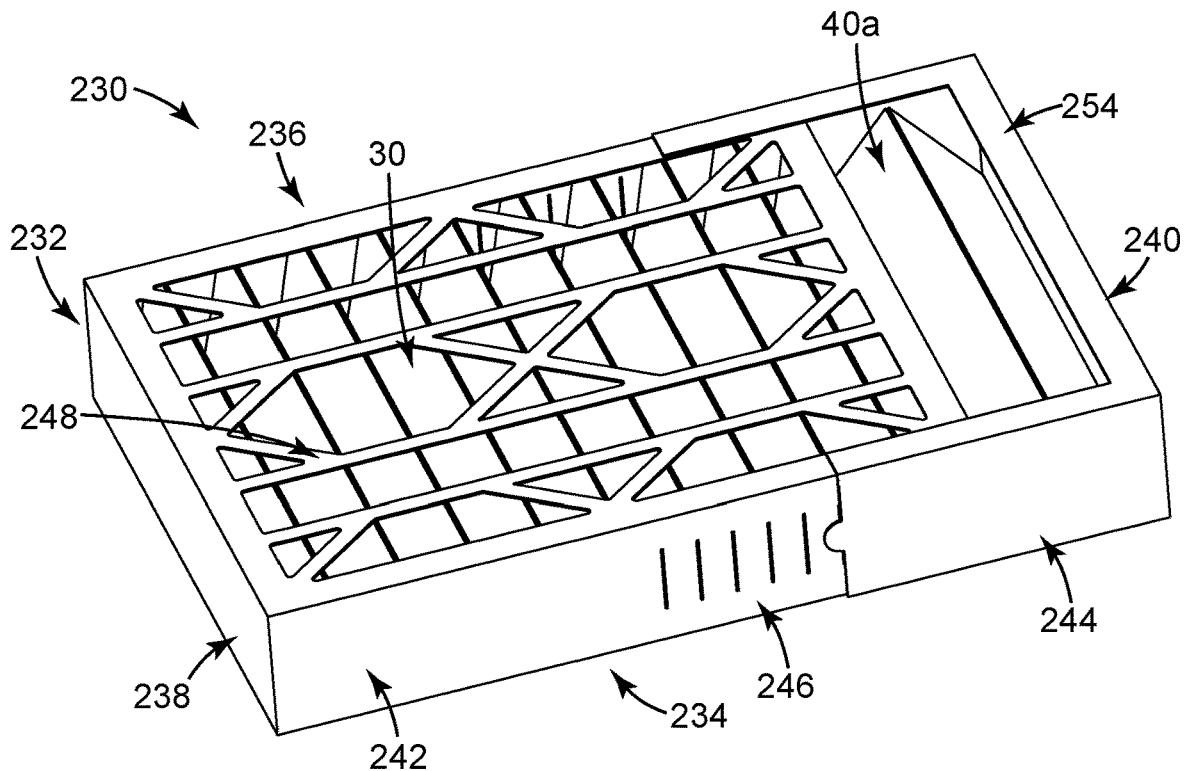
FIG. 4B is a perspective view of the air filter of FIG. 4A in an expanded state.

FIGS. 1A and 1B illustrate the line of separation 180 (and thus the corresponding unbonded portions 204, 214 (FIG. 3A) associated with the first pleat 40*a*) as being centrally located relative to a length of the air filter 20. However, other locations are equally acceptable, including the separable support member 34*a* and the freely expandable pleat(s) 40*a* can being located in closer proximity to one of the end frame structures 104, 106. For example, FIG. 4A illustrates another air filter 230 in accordance with principles of the present disclosure. The air filter 230 includes the filter media assembly 30 as described above and an outer frame assembly 232. The outer frame assembly 232 can be akin to the outer frame assembly 32 (FIG. 1A), and includes opposing side frame structures 234, 236 and opposing side frame structures 238, 240. The frame structures 234-240 can have any of the constructions described above. The side frame structures 234, 236 can incorporate any of the selectively expandable configurations previously described, allowing expansion from an initial state (FIG. 4A) to an expanded state (one example of which is shown in FIG. 4B), for example first and second frame members 242, 244 that are slidably connected to one another and optionally locked relative to another by a locking apparatus 246 (referenced generally in FIG. 4B). A grid or grill structure 248 overlies a major face of the filter media assembly 30. A support member 250 (referenced generally in FIG. 4A) is also provided, for example by a first segment 252 (best seen in FIG. 4B) of the grid or grill structure 248 and a second segment 254 of the second end frame structure 240. The segments 252, 254 are separable from one another at a line of separation 256 with transitioning of the air filter 220 from the initial state to the expanded state. Bonding of the filter media assembly 30 to the outer frame assembly 232 (and the grid or grill structure 248 is such that the unbonded pleat(s) 40*a* is aligned with the line of separation 256 such that the pleat 40*a* can freely expand with transitioning of the outer frame assembly 232 from the initial state to the expanded state. As shown, the unbonded or freely expandable pleat 40*a* and connection between the frame members 242, 244 is off-set from a centerline of the air filter 220.

Figure 5:
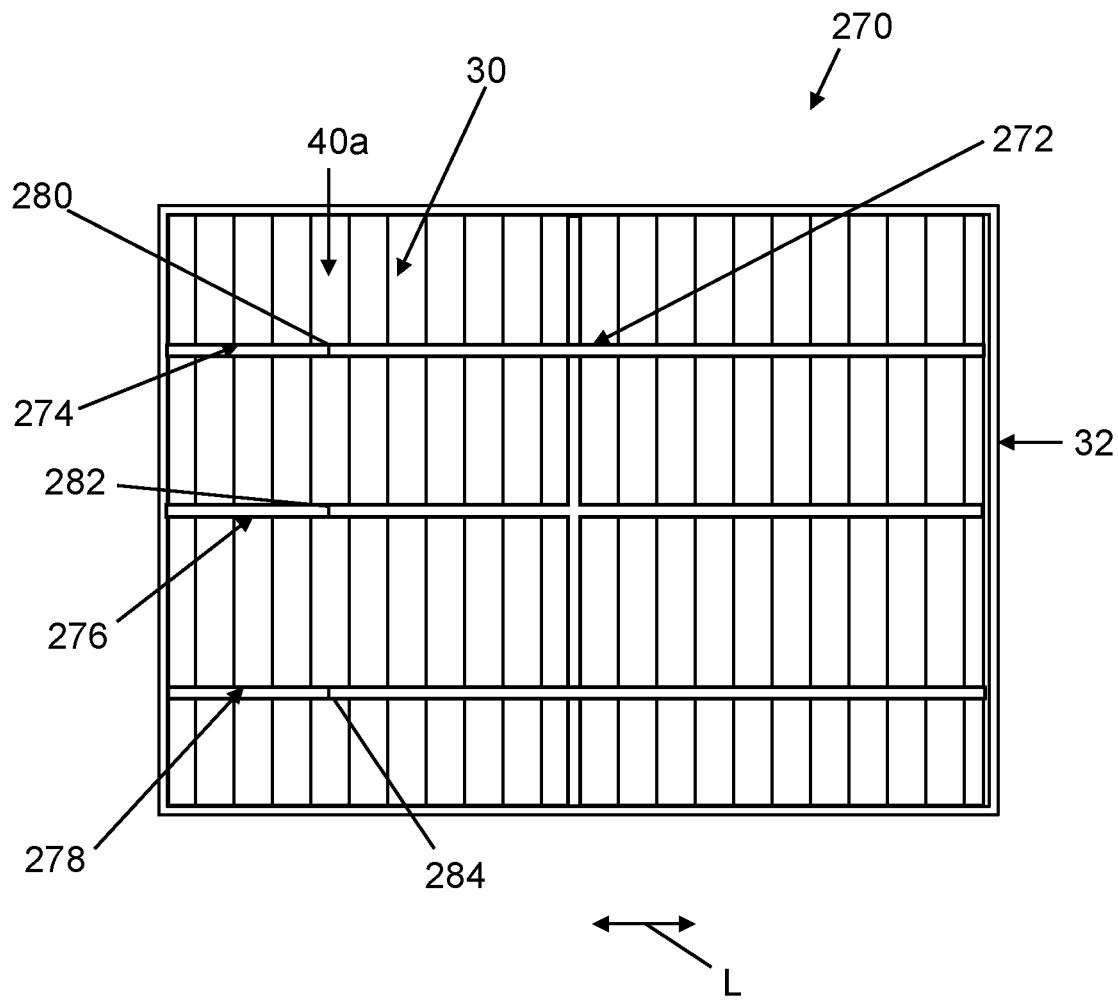
FIG. 5 is a simplified top view of another air filter in accordance with principles of the present disclosure.

While FIGS. 1A and 1B reflect a single separable support member 34*a* overlying the freely expandable pleat(s) 40*a*, two or more support members overlying the freely expandable pleat(s) 40*a* can be provided, each incorporating a line of separation. For example, FIG. 5 is a simplified illustration of another air filter 270 in accordance with the principles of the present disclosure and akin to the air filter 20. The air filter 270 includes the filter media assembly 30 and the outer frame assembly 32 as described above. A grid or grill structure 272 overlies a major face of the filter media assembly 30, and includes first-third support members 274-278. Each of the support members 274-278 extends over a pleat 40*a* that is otherwise able to freely expand with expansion of the outer frame assembly 32 in the length direction L (e.g., the pleat 40*a* is free of direct bonding or adhesion to the opposing side frame structures 100, 102). A line of separation 280-284 as described above is formed in or provided with each of the support members 274-278. The lines of separation 280-284 are aligned with each other, and with the freely expandable pleat 40*a* (and thus with the unbonded portions (hidden) of the side edges of the filter media assembly 30). To permit free expansion of the air filter 270 from the initial state of FIG. 5 to an expanded length state (not shown), each of the support members 274-278 are first separated into first and second segments at the corresponding line of separation 280-284. The outer frame assembly 32 can then be manually transitioned to the desired expanded length state commensurate with the explanations above.

Returning to the embodiment of FIG. 1A, the air filter 20 can optionally include an additional grill or grid structure (not shown) overlying the second major face 72 (hidden in FIG. 1A, but identified, for example, in FIG. 2B) of the filter media assembly 30. Where provided, to the extent the opposite face grill or grid includes one or more support members extending over the pleat(s) 40*a* otherwise free of direct bonding or adhesion to the side frame structures 100, 102, the support members will include a line of separation as described above and will be aligned with the pleat(s) 40a. Regardless, the grill(s) or grid(s), including the support member(s) described above, can be formed of a material similar to that of the outer frame assembly 32. In some embodiments, the grill(s) or grid(s) can be integrally formed with, and folded relative to, the outer frame assembly 32. In other embodiments, the support member(s) 34 can be separately formed and subsequently attached to the outer frame assembly 32.

As stated above, air filters of the present disclosure are optionally configured to permit manual expansion from the initial state in the width direction W to an expanded width state in addition to or as an alternative to expansion in the length direction L. For example, the end frame structures 104, 106 can have any of the constructions described above with respect to the side frame structures 100, 102 that are otherwise conducive to expansion. Further, the filter media assembly 30 can be mounted to outer frame assembly 32 in a manner permitting corresponding sliding expansion of the end frame structures 104, 106.

Figure 6A:
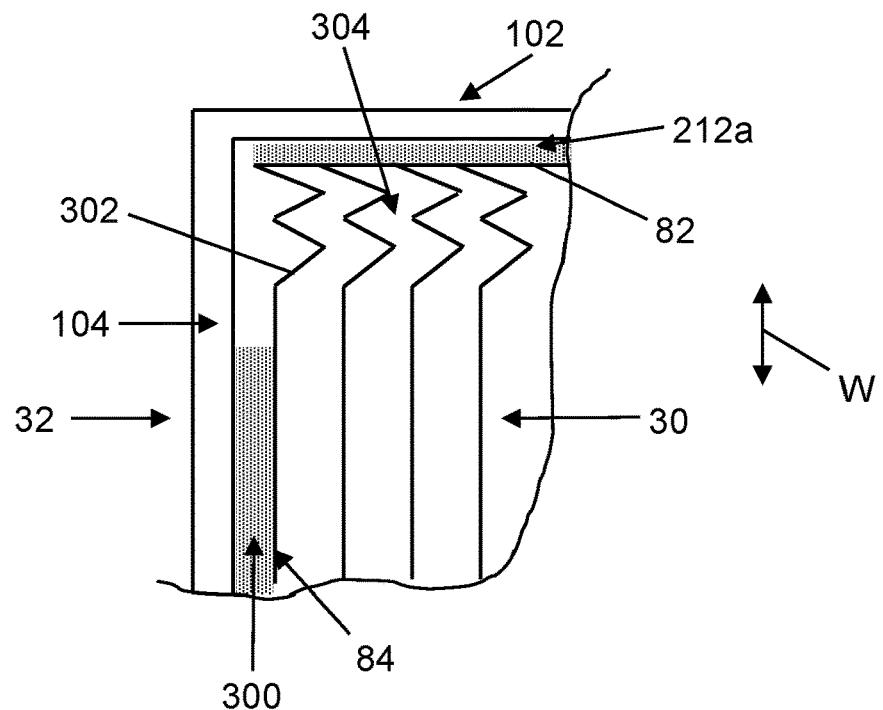
FIG. 6A is a simplified, enlarged, top view of a portion of the air filter of FIG. 1A in an initial state.
Figure 6B:
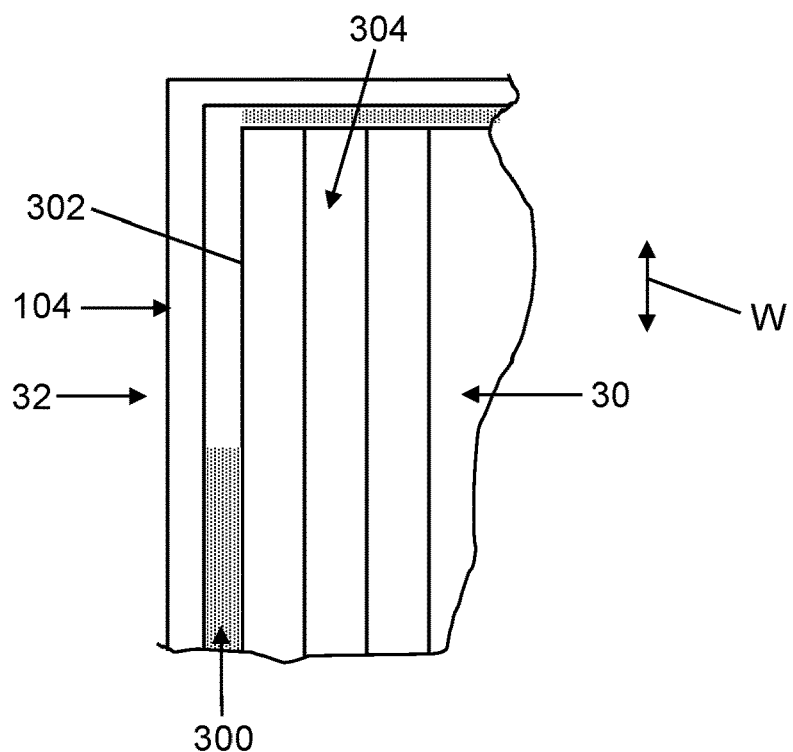
FIG. 6B is a top view of the arrangement of FIG. 6A in an expanded state.

For example, FIG. 6A is a simplified representation of a portion of the filter media assembly 30 and the outer frame assembly 32 in the initial state, and illustrates that a portion of the first end edge 84 of the filter media assembly 30 is bonded or fixed to the first end frame structure 104 by an adhesive strip or bead 300. A second portion 302 of the first end edge 84 is free of direct bonding to the first end frame structure 104. As a point of reference, FIG. 6A also shows bonding of the second side edge 82 to the second side frame structure 102 by the adhesive 212a as described above. The unbonded portion 302 can correspond with a "crumple zone" 304 in the filter media assembly 30. The crumple zone 304 can be conventionally generated with HVAC pleated air filter manufacturing techniques in which the side edges 80, 82 of the pleated filter media assembly 30 are compressed or crumpled on to themselves to create an overhang that promotes adhesive bonding with the corresponding side frame structure 100, 102. Because the first end edge 84 is not bonded to the first end frame structure 104 at the unbonded portion 302, the crumple zone 304 freely expands with expansion of the first end frame structure 104 in the width direction W to an expanded width state, as generally illustrated by FIG. 6B.

Figure 7:
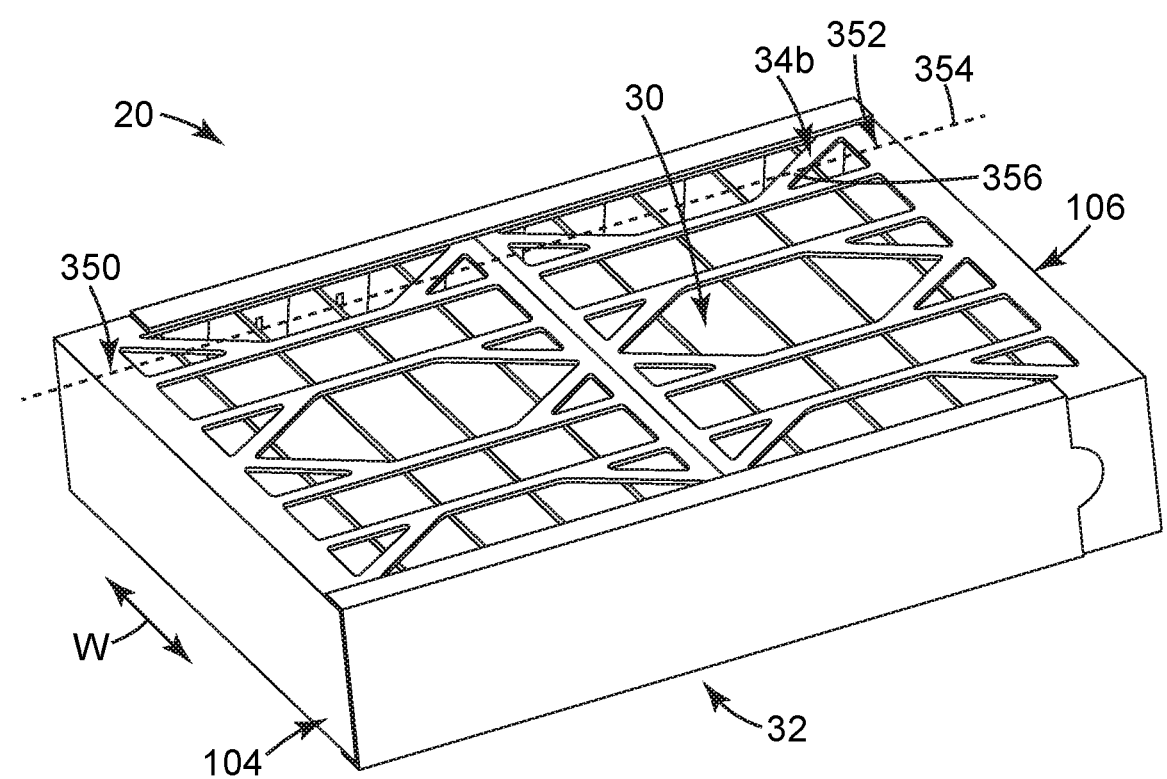
FIG. 7 is a perspective view of the air filter of FIG. 1A.

FIG. 7 is another illustration of the air filter 20 of FIG. 1A in the initial state, and generally identified at 350 a region at which the filter media assembly 30 is optionally not directly bonded or adhered to the first end frame structure 104, and at 352 a region at which the filter media assembly 30 is optionally not directly bonded or adhered to the second end frame structure 106. As shown, the regions 350, 352 are aligned with one another in width direction W, as represented by an imaginary line 354. With the optional embodiments in which the air filter 20 incorporates the width expansion features described above, any support members 34 intersecting the imaginary line 354 can include a line of separation as described above proximate the point of intersection. For example, a second support member 34b is identified in FIG. 7, and intersects the alignment line 354. A line of separation 356 is formed in the second support member 34b. The line of separation 356 is thus aligned with the unbonded regions 350, 352; prior to expansion of the air filter 20 in the width direction W to an expanded width state, the line of separation 356 is manually completed by a user, separating the second support member 34b into first and second segments that readily separate from one another with expansion of the outer frame assembly 32 in the width direction W.

The air filters of the present disclosure are useful in a wide variety of air handling applications. In some embodiments, the air filter 20 can be configured for use with HVAC systems. With these and other embodiments, a user is afforded the ability to custom fit the air filter 20 (via expansion in one or both of the length and width directions L, W) to an exact size of the air filter compartment provided with the user's actual HVAC system. In related embodiments, the air filter 20 can be provided as a universal product, appropriate for use with a number of different HVAC systems that might otherwise have slightly different air filter compartment dimensions. By way of example, different HVAC system manufacturers may each specify to a user that a 16"×20"×4" air filter should be used with their HVAC system, yet the actual air filter compartment is sized and shaped to provide a best fit with slightly different dimensions (e.g., 16"×19"×4"; 16"×21"×4"; 15"×20"×4"; 17"×20"×4"; etc.). With this in mind, the air filter 20 of the present disclosure can be configured such that in the initial state, outer length and width dimensions correspond with the smallest expected air filter compartment dimensions utilized by several different HVAC system manufacturers. Continuing with the above example, then, the air filter 20 can be configured to have outer dimensions of 15"×19"×4" in the initial state, and promoted to potential users as being acceptable for use with any HVAC system requiring a 16"×20"×4" air filter. Upon evaluating the size of the actual air filter compartment, the user can then, if necessary, expand the 15"×19"×4" air filter in one or both of the length and width directions L, W as described above, transitioning the air filter 20 to an expanded state having dimensions corresponding with those of the actual air filter compartment. It will be understood that the air filters of the present disclosure need not necessarily be expandable in both the length direction L and the width direction W; beneficial air filters in accordance with principles of the present disclosure can instead be expandable in only the length direction L or in only the width direction W. Similar benefit can also be provided with other air filter applications, such as air purifiers, window air filters, etc.

The air filters and related methods of use of the present disclosure provide a marked improvement over previous designs. By promoting simple, manual expansion in one or both of the length and width directions, the air filters of the present disclosure afford a user the ability to achieve a "best fit" with the air handling device to which the air filter is installed.

Although the present disclosure has been described with reference to preferred embodiments, workers skilled in the art will recognize that changes can be made in form and detail without departing from the spirit and scope of the present disclosure.

What is claimed is:

1. An air filter comprising:
  a filter media assembly defining opposing, first and second major faces and a perimeter;
  an outer frame assembly arranged about the perimeter; and
  a first support member connected to the outer frame assembly and extending across the first major face, wherein the support member defines a line of separation at which the first support member can be separated into first and second segments to permit expansion of the air filter in a first direction, wherein the perimeter of the filter media assembly is defined by opposing, first and second side edges and opposing, first and second end edges;

the outer frame assembly includes a first side frame structure covering the first side edge;

a first portion of the first side edge is adhered to the first side frame structure and a second portion of the first side edge is free of adhesion to the first side frame structure; and the line of separation is aligned with the second portion.

2. The air filter of claim 1, wherein the perimeter of the filter media assembly is defined by opposing, first and second side edges and opposing, first and second end edges, and further wherein the line of separation is spaced from each of the first and second side edges and each of the first and second end edges.

3. The air filter of claim 1, wherein the filter media assembly includes a pleated filter media defining a plurality of pleats.

4. The air filter of claim 3, wherein the line of separation is aligned with a first pleat of the plurality of pleats.

5. The air filter of claim 4, wherein the air filter is configured such that following separation of the first support member at the line of separation into the first and second segments, expansion of the air filter in the first direction includes expansion of the first pleat.

6. The air filter of claim 1, wherein:

the frame assembly further includes a second side frame structure covering the second side edge;

a first portion of the second side edge is adhered to the second side frame structure and a second portion of the second side edge is free of adhesion to the second side frame structure; and the second portion of the second side edge is aligned with the line of separation and the second portion of the first side edge.

7. The air filter of claim 6, wherein:

the filter media assembly includes a pleated filter media defining a plurality of pleats, each of the plurality of pleats including a fold line extending from the first side edge to the second side edge;

the first portion of the first and second side edges includes at least first and second pleats of plurality of pleats; and the second portion of the first and second side edges includes a third pleat of the plurality of pleats.

8. The air filter of claim 7, wherein the air filter is configured such that following separation of the first support member into the first and second segments, expansion of the air filter in the first direction includes expansion of the third pleat and non-expansion of the first and second pleats.

9. The air filter of claim 6, wherein the first and second side frame structures each include a first frame member slidably connected to a second frame member, and further wherein expansion of the air filter in the first direction includes the corresponding first and second frame member sliding relative to one another.

10. The air filter of claim 7, wherein the frame assembly further includes a first end frame structure covering the first end edge and a second end frame structure covering the second end edge, and further wherein at least a first portion of the first end edge is adhered to the first end frame structure and at least a first portion of the second end edge is adhered to the second end frame structure.

11. The air filter of claim 10, wherein at least a second portion of the first end edge is free of adhesion to the first end frame structure and at least a second portion of the second end edge is free of adhesion to the second end frame structure, and even further wherein the air filter is configured to permit expansion in a second direction by displacement of the first and second end frame structures relative to the second portion of the corresponding end edges.

12. The air filter of claim 1, further comprising a second support member extending across the first major face at a location apart from the first support member, the second support member defining a line of separation for separating the second support member into first and second segments, the line of separation of the second support member being aligned with the line of separation of the first support member.

13. An air filter, comprising:

a filter media assembly defining opposing, first and second major faces and a perimeter;

an outer frame assembly arranged about the perimeter; and a support member connected to the outer frame assembly and extending across the first major face, wherein the support member defines a line a separation at which the first support member can be separated into first and second segments;

wherein the air filter is configured to be expandable from an initial state to an expanded state, wherein the initial state includes the support member intact and the expanded state includes the support member separated into the first and second segments, and further wherein the air filter is configured to be installed into an air handling device in both of the initial and expanded states.

14. A method of installing an air filter to an air handling device, the method comprising:

receiving an air filter in an initial state, the air filter including:

a filter media assembly defining opposing, first and second major faces and a perimeter, an outer frame assembly arranged about the perimeter, and a first support member connected to the outer frame assembly and extending uninterrupted across the first major face in the first state, wherein the first support member defines a line of separation at which the first support member can be separated into first and second segments to permit expansion of the air filter in a first direction, wherein the perimeter of the filter media assembly is defined by opposing, first and second side edges and opposing, first and second end edges;

the outer frame assembly includes a first side frame structure covering the first side edge;

a first portion of the first side edge is adhered to the first side frame structure and a second portion of the first side edge is free of adhesion to the first side frame structure; and the line of separation is aligned with the second portion;

evaluating a size of an air filter compartment provided with the air handling device;

separating the first support member at the line of separation to create first and second segments;

expanding the air filter from the initial state to an expanded state corresponding with the evaluated size, wherein the step of expanding includes transitioning the first segment away from the second segment; and inserting the air filter in the expanded state into the air filter compartment.

15. The method of claim 14, wherein the air filter further includes a second support member connected to the outer frame assembly and extending uninterrupted across the first major face in the first state, the second support member defining a line of separation, the method further comprising:
- separating the second support member at the corresponding line of separation to create first and second segments prior to the step of expanding the air filter from the initial state to an expanded state;
- wherein the step of expanding includes transition the first and second segments of the second support member away from one another.

16. The method of claim 14 wherein the filter media assembly includes a pleated filter media defining a plurality of pleats, the plurality of pleats including a first pleat, and further where in the step of expanding the air filter includes expanding the first pleat.

17. The method of claim 16, wherein the plurality of pleats includes a second pleat, and further wherein the second pleat has a substantially identical width in the first and second states.

18. The method of claim 14, wherein the outer frame assembly includes opposing side frame structures covering opposing side edges, respectively, of the perimeter, and further wherein the step of expanding includes expanding each of the opposing side frame structures.

19. The method of claim 18, wherein each of the opposing side frame structures includes a first frame member slidably connected to a second frame member, and further wherein the first frame member is locked relative to the corresponding second frame member in each of the initial and expanded states.

* * * * *

UNITED STATES PATENT AND TRADEMARK OFFICE
CERTIFICATE OF CORRECTION

PATENT NO. : 10,981,099 B2  
APPLICATION NO. : 15/762713  
DATED : April 20, 2021  
INVENTOR(S) : Glen Gregerson et al.

Page 1 of 1

It is certified that error appears in the above-identified patent and that said Letters Patent is hereby corrected as shown below:

In the Claims

Column 15, Line 43, insert -- the -- after "of"

Column 16, Line 21, delete "a" and insert -- of --

Column 17, Line 16, delete "where in" and insert -- wherein --

Signed and Sealed this  
Thirtieth Day of November, 2021

Drew Hirshfeld  
*Performing the Functions and Duties of the*  
*Under Secretary of Commerce for Intellectual Property and*  
*Director of the United States Patent and Trademark Office*